UNITED STATES PATENT OFFICE.

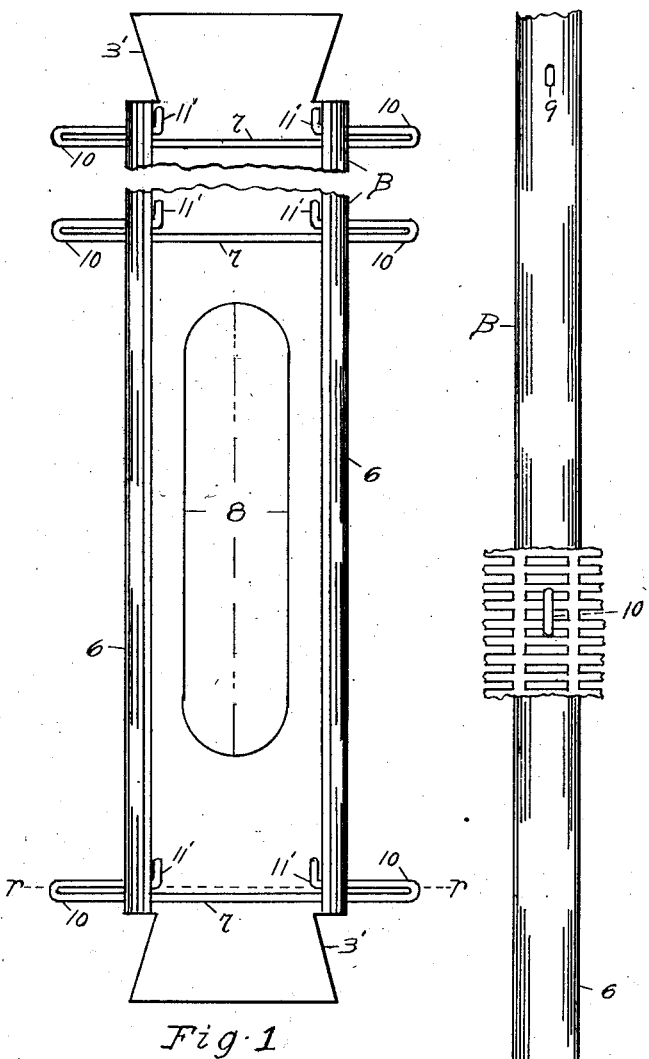

DANIEL DOWD, OF LOS ANGELES, CALIFORNIA.

STUD FOR USE IN BUILDING CONSTRUCTION.

1,037,738. Specification of Letters Patent. Patented Sept. 3, 1912.

Application filed February 7, 1911. Serial No. 607,217.

*To all whom it may concern:*

Be it known that I, DANIEL DOWD, a citizen of the United States, and a resident of Los Angeles, in the county of Los Angeles and State of California, have invented an Improved Stud for Use in Building Construction, of which the following is a specification.

This invention relates to metal studding for partition walls for fireproof buildings and means for attaching lathing to the same and is designed to be used in conjunction with the construction described in my former applications Nos. 506,436 and 552,045. The object of this invention is to provide a stud which can be readily stamped and worked out of thin metal to the special forms and shapes here shown, which is light in weight and provided with simple means whereby lath or other suitable material may be easily attached to the same.

In the accompanying drawings forming part of this specification, Figure 1 is a side elevation of one of the improved studs broken away in length. Fig. 2 is a plan view of one of the lath fasteners used in connection with my improved stud. Fig. 3 is a transverse section of the stud. Fig. 4 is an edge view of a portion of a stud with a lath section supported thereon.

The stud B, shown in face view in Fig. 1, is constructed of thin sheet metal whose side edges are curved and turned inward, thus forming, approximately, semicircles 6, which form gives the stud the required rigidity to adapt it for its functions. The semicircular parts are provided with openings in which lath supports or fasteners 7 are held. Such fasteners are formed of stout wire whose ends 11 are doubled, or bent backward parallel to the body of the fastener. The loops 10 are then inserted through the openings in the curved edges of the stud, and the ends of the inbent portions are turned up, as shown at 11′ in Fig. 1 and also in Fig. 3, whereby the accidental detachment of the fastener is prevented. The doubled ends 10 of the fastener thus project laterally from the curved edges of the stud B, and the metal lath may be hung thereon, as shown in Fig. 4. To prevent detachment of the lath, the ends of the fastener may be turned up, thus forming hooks which hold the lath securely.

By the construction of the stud with a flat body and rounded sides, it has maximum rigidity and lightness, and may be very cheaply manufactured. It will also be seen that owing to the convexity of the curved sides 6 of the stud, the lath can come or lie in contact only with a single and very narrow portion of the stud, which is a feature of considerable importance in practical use.

The ends 3′ of the stud have a dovetail form which adapts them to be inserted and held in a channel iron such as shown and described in my Patent No. 1,004,859, issued October 3, 1911.

The body of the stud is preferably cut out, as indicated at 8, that is to say, provided with longitudinal openings for the purpose of reducing the weight of the stud and also to provide a passage for pipes and wires through the walls of which the studs may form a part.

What I claim is:—

The combination with a metal stud having a straight body and inwardly curved and rounded sides provided with opposite openings, and a lath fastener consisting of a wire having its ends doubled upon itself, said ends projecting through the said openings and the terminals of the wire being bent laterally to form stops on the inner sides of the rounded portions which prevent accidental detachment of the fastener, as shown and described.

In testimony whereof, I have affixed my signature in the presence of two witnesses.

DANIEL DOWD.

Witnesses:
 LINDA THOMPSON,
 L. E. THOMPSON.